(12) United States Patent
Suzuki

(10) Patent No.: US 9,592,775 B2
(45) Date of Patent: Mar. 14, 2017

(54) WIRING HARNESS PROTECTOR FIXING STRUCTURE

(71) Applicant: Sumitomo Wiring Systems, Ltd., Yokkaichi, Mie (JP)

(72) Inventor: Takashi Suzuki, Mie (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 15/058,190

(22) Filed: Mar. 2, 2016

(65) Prior Publication Data

US 2016/0284439 A1    Sep. 29, 2016

(30) Foreign Application Priority Data

Mar. 25, 2015   (JP) .................................. 2015-062448

(51) Int. Cl.
| | | |
|---|---|---|
| *H02G 3/04* | (2006.01) | |
| *B60R 16/02* | (2006.01) | |
| *H02G 3/34* | (2006.01) | |
| *H01B 7/00* | (2006.01) | |

(52) U.S. Cl.
CPC ....... *B60R 16/0215* (2013.01); *H01B 7/0045* (2013.01); *H02G 3/04* (2013.01); *H02G 3/0462* (2013.01); *H02G 3/34* (2013.01)

(58) Field of Classification Search
None
See application file for complete search history.

(56) References Cited

U.S. PATENT DOCUMENTS 6,814,581 B2 * 11/2004 Matsuo .............. H01R 13/5202
439/35

FOREIGN PATENT DOCUMENTS

| JP | 2004-178913 | 6/2004 |
|---|---|---|
| JP | 2013-143841 | 7/2013 |

* cited by examiner

*Primary Examiner* — Dimary Lopez Cruz
(74) *Attorney, Agent, or Firm* — Gerald E. Hespos; Michael J. Porco; Matthew T. Hespos

(57) ABSTRACT

It is aimed to provide a wiring harness protector fixing structure having a novel structure and capable of firmly positioning and fixing a protector to an end part of a wiring harness with excellent durability while improving waterproofness even if a mounting member such as a vehicle body panel is not present around. Engaging projections are formed on a flange portion of a metal bracket, whereas a wiring harness protector includes a first divided body and a second divided body to be assembled and integrated. By assembling the first and second divided bodies, the engaging projections of the metal bracket are engaged with engaging holes provided on flange wall portions of the first and second divided bodies, and contact surfaces and provided on at least parts of the flange wall portions come into contact with the flange portion of the metal bracket.

7 Claims, 7 Drawing Sheets

WIRING HARNESS PROTECTOR FIXING STRUCTURE

BACKGROUND

1. Field of the Invention

The present invention relates to a wiring harness protector fixing structure to be mounted on an end part of a wiring harness to which a shield member made of metal and fixed to another member is externally fitted.

2. Description of the Related Art

Electric devices such as an inverter and a motor of an automotive vehicle are connected by a wiring harness, for example, in an electric vehicle, a hybrid vehicle or the like. As described in Japanese Unexamined Patent Publication No. 2004-178913, a metal bracket, including a tubular portion into which the wiring harness is inserted, and a shield member formed of a braided wire extending from an end part of the tubular portion are externally fitted to the wiring harness to provide a shield function and prevent the leakage of electrical noise generated from an inverter and the like to outside through the wiring harness. An end part of the metal bracket is fixed to another member, such as the inverter, by a bolt or the like and a wire-side terminal (connector), provided on an end of the wiring harness projecting outwardly through the tubular portion of the metal bracket, is connected to a connecting portion of the inverter or the like.

Since the wire-side terminal provided on the end of the wiring harness is connected to an electrical device such as the inverter, an end part of the wiring harness needs to be protected, particularly from collision with other members to ensure connection reliability. Accordingly, a protector is externally fitting to the wiring harness to protect the end part of the wiring harness.

However, if a suitable mounting member such as a vehicle body panel is not present near an arrangement position of the protector, it is difficult to position the protector on the wiring harness. Thus, there has been a problem that the protector is displaced on the wiring harness and cannot protect a targeted part if the protector is merely externally fitted to the wiring harness.

Accordingly, as shown in FIG. 1 of Japanese Unexamined Patent Publication No. 2013-143841, a structure is provided which fixes a protector to a metal bracket by forming a locking rib on a tubular portion of the bracket to be fixed to another member such as an inverter and inserting and locking this locking rib to an engaging groove formed on the inner surface of the protector. Thus, the protector can be positioned and arranged on an end part of a wiring harness and the end part of the wiring harness can be reliably protected.

However, if the engaging groove for accommodating the locking rib of the metal bracket is provided on the inner surface of the protector, there is a possibility that water enters inside through a small clearance between the locking rib and the engaging groove when an outer surface of the protector is exposed to water. Further, if a tensile force of the wiring harness is applied between fitting surfaces of the thin locking rib and the thin engaging groove in a concentrated manner there is a possibility that breakage of an accommodation groove or the like can occur. Furthermore, in terms of waterproofing, it may be necessary in some cases to close a clearance between the tubular portion and the inner surface of the protector by mounting a rubber seal on the outer peripheral surface of the tubular portion of the metal bracket to prevent the penetration of water or the like in the wiring harness from the outside of the protector. In such cases, the locking rib formed on the tubular portion obstructs the mounting of the rubber seal, wherefore there is also an inherent problem of being difficult to adopt a fixing structure using the locking rib.

The present invention was developed against the aforementioned situation and aims to provide a wiring harness protector fixing structure having a novel structure and capable of firmly positioning and fixing a protector to an end part of a wiring harness with excellent durability while improving waterproofness even if a mounting member such as a vehicle body panel is not present around.

SUMMARY

The invention relates to a wiring harness protector fixing structure for use with a wiring harnesss. A tubular portion of a metal bracket is fixed to an end part of the wiring harness and is fixed to another member. A shield member formed of a braided extends from a first opening end part of the tubular portion and is obtained by braiding metal thin wires into a mesh. The shield member is externally fitted on and configured to protect the end part of the wire. A flange portion extends outward from a second opening end part of the tubular portion opposite the first opening end part in a direction perpendicular to an axis of the tubular portion. Engaging projections are formed on the flange portion. The wiring harness protector includes a first divided body and a second divided body to be assembled and integrated from opposite sides in the direction perpendicular to the axis of the tubular portion. Each of the first and second divided bodies includes a divided tube portion. A protecting tube portion for covering the tubular portion of the metal bracket from an outer peripheral side is formed by assembling the divided tube portions with the first and second divided bodies assembled. The wiring harness is pulled out from one opening end part of the protecting tube portion. Flange wall portions extending in the direction perpendicular to the axis are provided to project on peripheral edge parts of the respective divided tube portions constituting the other opening end part of the protecting tube portion. The engaging projections of the metal bracket are engaged with engaging holes provided on the flange wall portions and contact surfaces provided on at least parts of the flange wall portions come into contact with the flange portion of the metal bracket by assembling the first and second divided bodies.

According to this configuration, the engaging projections are provided on the flange portion extending from the tubular portion of the metal bracket, whereas the engaging holes are provided on the flange wall portions extending from the opening end part of the protecting tube portion of the wiring harness protector, and the protector is fixed to the metal bracket by engaging the engaging projections and the engaging holes. Thus, as compared to a conventional case provided with a fixing structure by a rib and a groove between the outer surface of a tubular portion of a metal bracket and the inner surface of a protecting tube portion of a protector covering the tubular portion, a problem of penetration of water outside into the protector via the fixing structure can be prevented and the waterproofness of the wiring harness protector can be improved. Further, since a rib or the like is not provided on the outer surface of the tubular portion of the metal bracket and a groove or the like needs not be provided also on the inner surface of the protecting tube portion of the protector covering the tubular portion, a measure for improving waterproofness, for example, by mounting a rubber seal on the tubular portion to close a clearance between the tubular portion and the protecting tube portion can be adopted without any problem.

Further, the wiring harness protector covering the tubular portion of the metal bracket in an externally fitted state is configured by the first and second divided bodies assembled from the opposite sides in the direction perpendicular to the axis of the tubular portion. Thus, even if the fixing structure is provided at a position different from the tubular portion and the protecting tube portion, an operation of arranging the protecting tube portion of the wiring harness protector around the tubular portion of the metal bracket and an operation of engaging the engaging projections and the engaging holes constituting the fixing structure can be easily performed.

In addition, since the contact surfaces of the flange wall portions provided on the wiring harness protector are configured to come into contact with the flange portion of the metal bracket, even if a tensile force of the wiring harness or the like is applied to the protector, such an external force can be supported between the flange portion of the metal bracket and the wide contact surfaces of the flange wall portions of the wiring harness protector. This can solve problems such as an external force directly applied to the engaging projections and the engaging holes as in the conventional structure. Thus, the wiring harness protector can be firmly positioned and fixed to the end part of the wiring harness with excellent durability.

According to a second aspect of the present invention, the contact surfaces with the flange portion of the metal bracket are provided on lower sides of the flange wall portions of the protector which are easily affected by a load applied to the wiring harness when the wiring harness is pulled out downwardly from a position where the metal bracket is fixed to the other member. This enables an external force applied from the wiring harness to be more effectively and stably dispersed and supported on the metal bracket via the protector, and it is possible to stably fix the protector and further improve durability.

According to a third aspect of the present invention, the contact surfaces with the flange portion of the metal bracket are provided also on upper sides of the flange wall portions of the wiring harness protector, wherefore the protector can be more stably supported and fixed to the metal bracket on four points at opposite upper and lower sides of the wiring harness.

In any one of the first to third aspects, the engaging projections provided on the flange portion of the metal bracket include a first engaging projection and a second engaging projection projecting from side edge parts of the flange portion outwardly away from each other in an assembling direction of the first and second divided bodies with the tubular portion of the metal bracket at two positions separated in the assembling direction, the flange wall portion of the first divided body and the flange wall portion of the second divided body constituting the wiring harness protector are respectively provided with a first engaging hole and a second engaging hole extending in the assembling direction at positions of side edge parts of the flange wall portions corresponding to the first and second engaging projections, and the first engaging projection is engaged with the first engaging hole and the second engaging projection is engaged with the second engaging hole by bringing the first and second divided bodies closer to each other in the assembling direction. According to a fourth aspect of the present application, by respectively providing the first and second engaging projections projecting outwardly in the assembling direction of the first and second divided bodies and the first and second engaging holes extending in such an assembling direction at predetermined positions, the engagement of the first engaging projection and the first engaging hole and the engagement of the second engaging projection and the second engaging hole can be completed simultaneously with the assembling of the first and second divided bodies only by bringing the first and second divided bodies closer to each other in the assembling direction, and an operation of mounting the wiring harness protector on the metal bracket can be more efficiently and easily performed.

In the fourth aspect, a combination of the first engaging projection and the first engaging hole and a combination of the second engaging projection and the second engaging hole are respectively provided at opposite upper and lower sides of the tubular portion of the metal bracket. According to a fifth aspect of the present invention, since a pair of the first engaging projection and the first engaging hole and a pair of the second engaging projection and the second engaging hole are respectively provided at the opposite upper and lower sides of the tubular portion of the metal bracket, the protector can be more stably supported and fixed to the metal bracket on four points at the opposite upper and lower sides of the wiring harness.

In any one of the first to fifth aspects, the engaging projections are shaped to be flat plates projecting on a peripheral edge part of the flange portion, and the engaging holes are defined between facing surfaces of the flange wall portions and facing wall portions coupled to the flange wall portions and extending in parallel to the flange wall portions with clearances defined therebetween. According to a sixth aspect of the present invention, since the engaging projections shaped to be flat plates can be tightly held in the engaging holes defined between the facing surfaces of the flange wall portions and the facing wall portions, a stable fixing structure can be realized.

According to a seventh aspect of the present invention, in any one of the first to sixth aspects, a clearance between the tubular portion and the protecting tube portion is closed by a seal rubber mounted on the tubular portion of the metal bracket.

According to the seventh aspect, since a rib or the like is not provided on the outer surface of the tubular portion of the metal bracket and a groove or the like needs not be provided also on the inner surface of the protecting tube portion of the protector covering the tubular portion unlike before, the seal rubber can be mounted on the tubular portion. This enables the clearance between the tubular portion and the protecting tube portion to be closed and waterproofness to be improved.

In the present invention, the engaging projections are provided on the flange portion extending from the tubular portion of the metal bracket, whereas the engaging holes are provided on the flange wall portions of the wiring harness protector, and the protector is fixed to the metal bracket by engaging the engaging projections and the engaging holes. Thus, as compared to a conventional case provided with a fixing structure by a rib and a groove between the outer surface of a tubular portion of a metal bracket and the inner surface of a protecting tube portion of a protector, a problem of penetration of water outside into the protector via the fixing structure can be prevented and a measure for improving waterproofness by mounting a rubber seal on the tubular portion to close a clearance between the tubular portion and the protecting tube portion if necessary can be adopted. Further, since the wiring harness protector is configured by the first and second divided bodies, the operation of arranging the protecting tube portion of the wiring harness protector around the tubular portion of the metal bracket and the operation of engaging the engaging projections and the engaging holes constituting the fixing structure can be easily performed. In addition, since the contact surfaces of the flange wall portions provided on the wiring harness protector are configured to come into contact with the flange portion of the metal bracket, a tensile force of the wiring harness and the like can be supported between the flange portion of the metal bracket and the wide contact surfaces of the flange wall portions of the protector. Therefore, the wiring harness protector can be firmly positioned and fixed to the end part of the wiring harness with excellent durability.

DETAILED DESCRIPTION

Hereinafter, an embodiment of the present invention is described with reference to the drawings.

FIGS. 1 to 8 show a wiring harness 10 and a wiring harness protector 12 provided with a wiring harness protector fixing structure as one embodiment of the present invention. Note that fixing portions 58 to be described later are located on an upper side and a braided wire 38 is located on a lower side in a vehicle mounted state.

Figure 1:
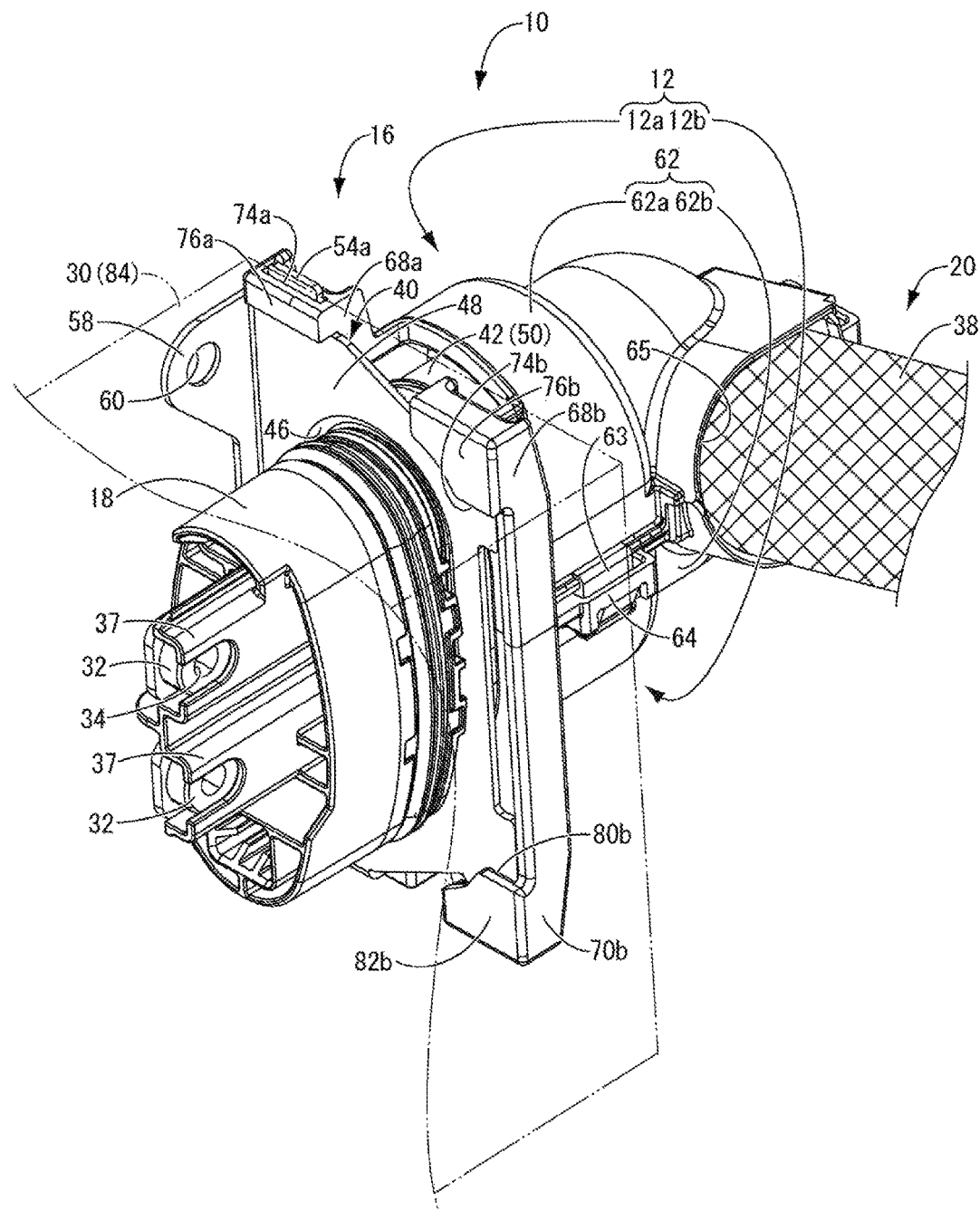
FIG. 1 is a perspective view showing a wiring harness protector fixing structure as one embodiment of the present invention.
Figure 2:
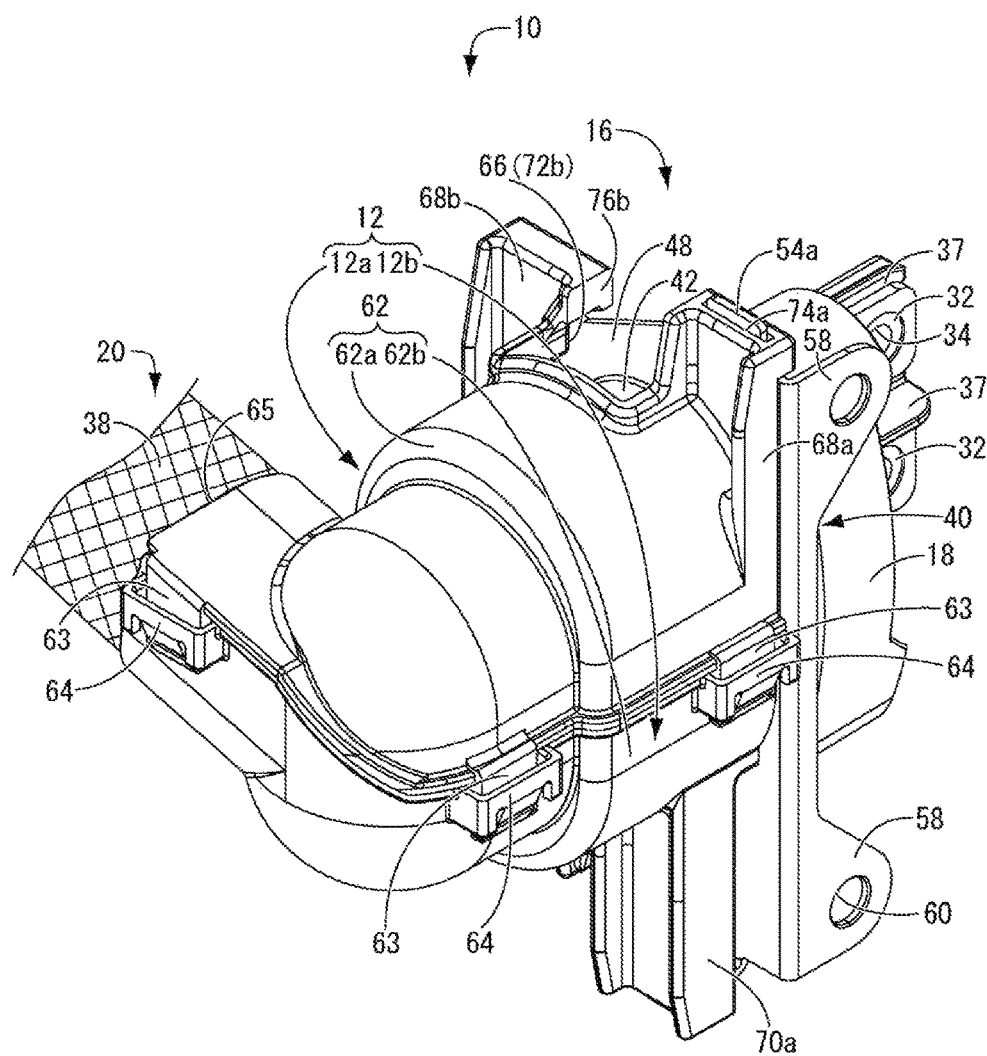
FIG. 2 is a perspective view when the embodiment is viewed from behind.
Figure 3:
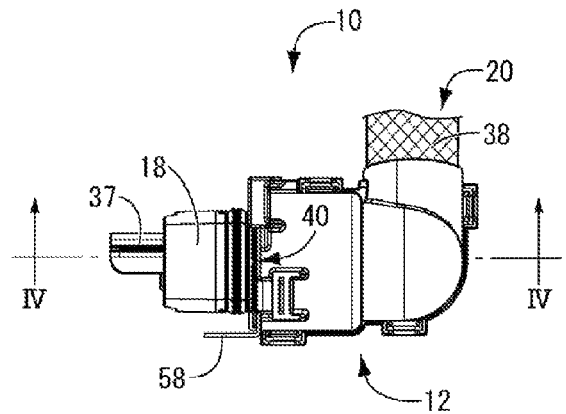
FIG. 3 is a bottom view of FIG. 1.
Figure 4:
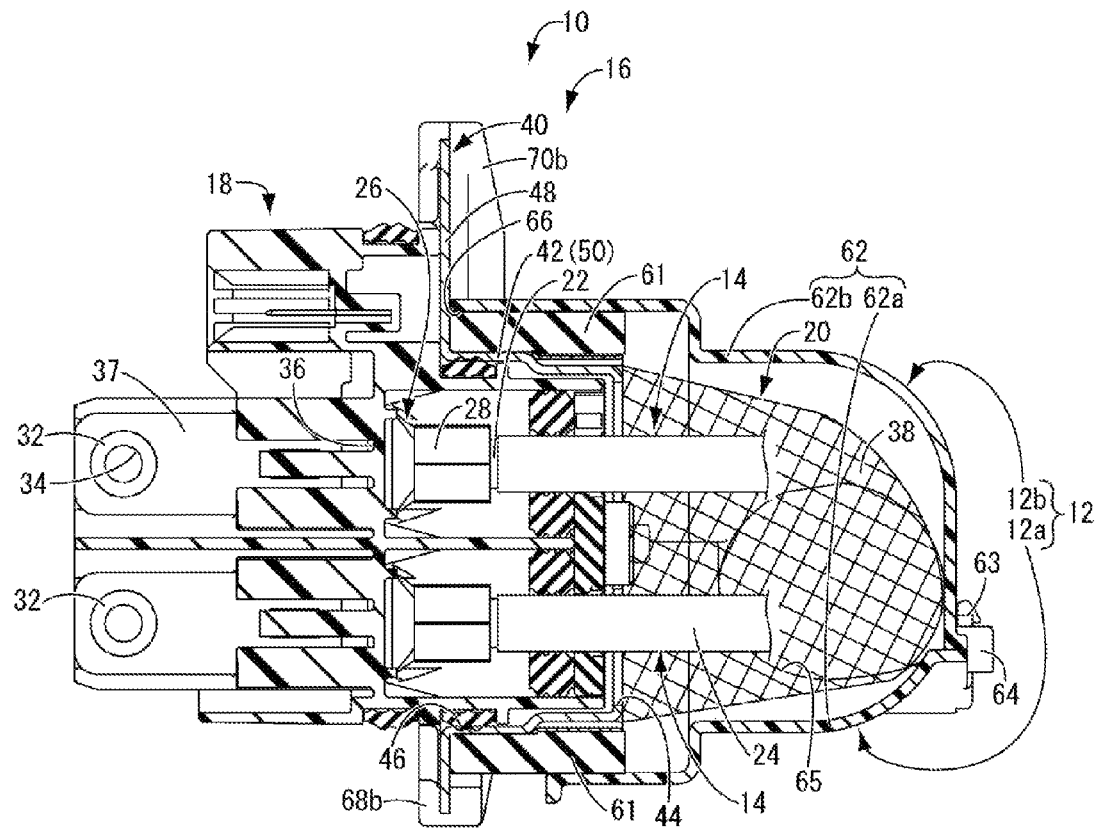
FIG. 4 is a section along IV-IV of FIG. 3.

As shown in FIG. 1, the wiring harness 10 is used, for example, to connect electrical devices such as an inverter and a motor in an electric vehicle. The wiring harness 10 is structured such that a connector housing 18 is provided on end parts 16 of a plurality of wires 14 and a shield member 20 is externally fitted to the connector housing 18 and wires 14. In this embodiment, the plurality of wires 14 comprises two wires. As shown in FIG. 4, the wire 14 includes a core 22 formed by bundling a plurality of metal wires made of copper, aluminum or the like and is covered by an electrically insulating insulation coating 24 made of ethylene-based resin or styrene-based resin, and includes no shield layer. A terminal fitting 26 is connected to the end part 16 of each wire 14. More specifically, the terminal fitting 26 is a substantially laterally long rectangular flat metal plate and includes a core crimping portion 28 to be crimped to the core 22 exposed on the end part 16 of the wire 14 and a connecting portion 32 extending from the core crimping portion 28 and to be electrically conductively connected to an other member 30 such as an inverter, and a bolt hole 34 is provided to penetrate through the connecting portion 32. Note that the other member 30 is shown by broken lines to facilitate understanding. The connector housing 18 is substantially in the form of a block extending in a front-back direction while having a substantially elliptical cross-sectional shape. Terminal fitting insertion holes 36 having open front and rear ends are provided to penetrate through the connector housing 18. Terminal fitting accommodating tube portions 37 substantially in the form of rectangular tubes projecting forward and open forward are formed on peripheral edge parts of front openings of the terminal fitting insertion holes 36. The terminal fitting 26 connected to the wire 14 is inserted into the terminal fitting insertion hole 36 from behind and so arranged that a base end part of the connecting portion 32 of the terminal fitting 26 is placed in the terminal fitting insertion hole 36 and a tip part of the connecting portion 32 is accommodated in the terminal fitting accommodating tube portion 37, whereby the wire 14 is positioned and fixed with respect to the connector housing 18.

The shield member 20 is externally fitted to these wires 14. The shield member 20 is structured such that the braided wire 38 extends from one opening end part 44 of a tubular portion 42 of a metal bracket 40 to be described later (see FIG. 4). The braided wire 38 is formed into a tubular shape by braiding a plurality of metal thin wires into a mesh. The braided wire 38 is slightly expandable and contractible in radial and length directions due to the flexibility of the metal thin wires.

Figure 8:
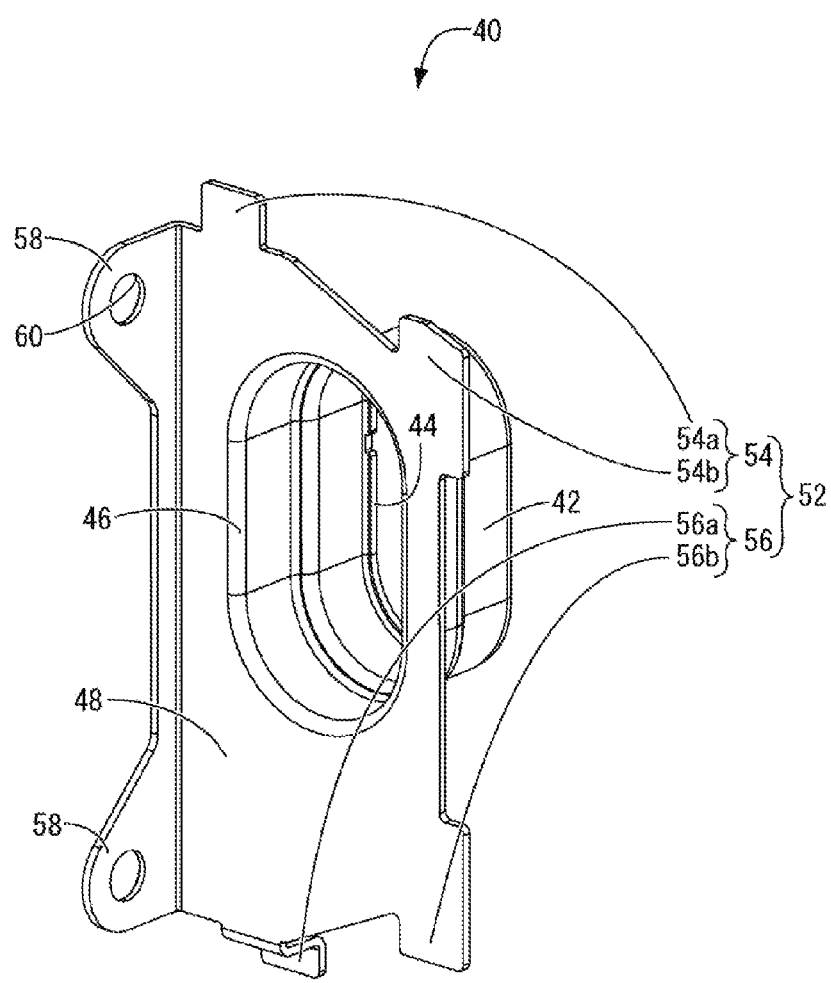
FIG. 8 is a perspective view of the metal bracket of the embodiment.

As shown in FIG. 8, the metal bracket 40 is a single component made of metal and formed by deep drawing a metal plate material such as iron. The metal bracket 40 is formed with the tubular portion 42 having an oval tubular shape as a whole and a flange portion 48 substantially in the form of a rectangular flat plate extending outwardly in a direction perpendicular to an axis of the tubular portion 42 from another opening end part 46 of the tubular portion 42 over the entire circumference. The tubular portion 42 is formed into an oval shape having a straight portion 50 extending straight while having a length to enable the plurality of wires 14 of the wiring harness 10 to be arranged side by side.

Further, the flange portion 48 of the metal bracket 40 is formed with engaging projections 52. More specifically, the engaging projections 52 include first engaging projections 54 and second engaging projections 56 projecting from side edge parts of the flange portion 48 outwardly away from each other in an assembling direction (vertical direction in FIG. 1) of a first divided body 12a and a second divided body 12b of the wiring harness protector 12 with the tubular portion 42 of the metal bracket 40 to be described later at two positions separated in the assembling direction as shown in FIG. 8. Here, the first engaging projections 54 are composed of an upper first engaging projection 54a substantially in the form of a rectangular flat plate projecting on an upper end part (left side of FIG. 8 in an arrangement when the flange portion 48 is fixed to the other member 30) of the flange portion 48 of the metal bracket 40 and a lower first engaging projection 54b substantially in the form of a rectangular flat plate projecting on a lower end part (right side of FIG. 8 in the same arrangement). On the other hand, as shown in FIG. 8, the second engaging projections 56 are composed of an upper second engaging projection 56a substantially in the form of a cranked flat plate projecting on the upper end part (left side of FIG. 8 in the same arrangement) of the flange portion 48 of the metal bracket 40 and a lower second engaging projection 56b substantially in the form of a rectangular flat plate projecting on the lower end part (right side of FIG. 8 in the same arrangement).

In addition, as shown in FIG. 1, the fixing portions 58 to be fixed, for example, to the other member 30 such as the inverter are provided on opposite sides of the upper end part (left side of FIG. 8 in the same arrangement) of the flange portion 48 of the metal bracket 40. More specifically, the fixing portion 58 is formed to have a substantially triangular cross-sectional shape and project from the flange portion 48 toward a side opposite to the tubular portion 42, and a bolt hole 60 is provided to penetrate through a substantially central part of the fixing portion 58.

As shown in FIGS. 1 to 4, the shield member 20 formed of the braided wire 38 extends from the one opening end part 44 of the metal bracket 40. The plurality of wires 14 are inserted into the braided wire 38 of the shield member 20 and the metal bracket 40, and the terminal fitting accommodating tube portions 37 accommodating the tip parts of the connecting portions 32 of the terminal fittings 26 of the respective wires 14 are drawn out toward the other member 30 located outside from the other opening end part 46 of the metal bracket 40. Further, a clearance between the tubular portion 42 and a protecting tube portion 62 to be described later is closed by a rubber or elastomeric seal 61 mounted on the outer peripheral surface of the tubular portion 42 of the metal bracket 40.

Next, the wiring harness protector 12 is described with reference to FIGS. 5 to 7. The wiring harness protector 12 is made of synthetic resin and provided to protect the end parts 16 of the wiring harness 10. More specifically, the wiring harness protector 12 is formed into an L-shaped and substantially hollow cylindrical shape and includes the first and second divided body 12a, 12b obtained by dividing the wiring harness protector 12 along an axial direction into halves. That is, the wiring harness protector 12 is configured by assembling and integrating the first and second divided bodies 12a, 12b from opposite sides in the direction perpendicular to the axis of the tubular portion 42 of the metal bracket 40. Thus, each of the first and second divided bodies 12a, 12b includes an L-shaped divided tube portion 62a, 62b having a substantially semicircular cross-sectional shape, and the protecting tube portion 62 for covering the tubular portion 42 of the metal bracket 40 from an outer peripheral side is formed by assembling the divided tube portions 62a, 62b with the first and second divided bodies 12a, 12b assembled. Note that, on facing end edge parts when the first and second divided bodies 12s, 12b are assembled, four locking pieces 63 are formed on the first divided body 12 and locking frames 64 into which the four locking pieces 63 are inserted to be locked are formed on the second divided body 12b.

Figure 5:
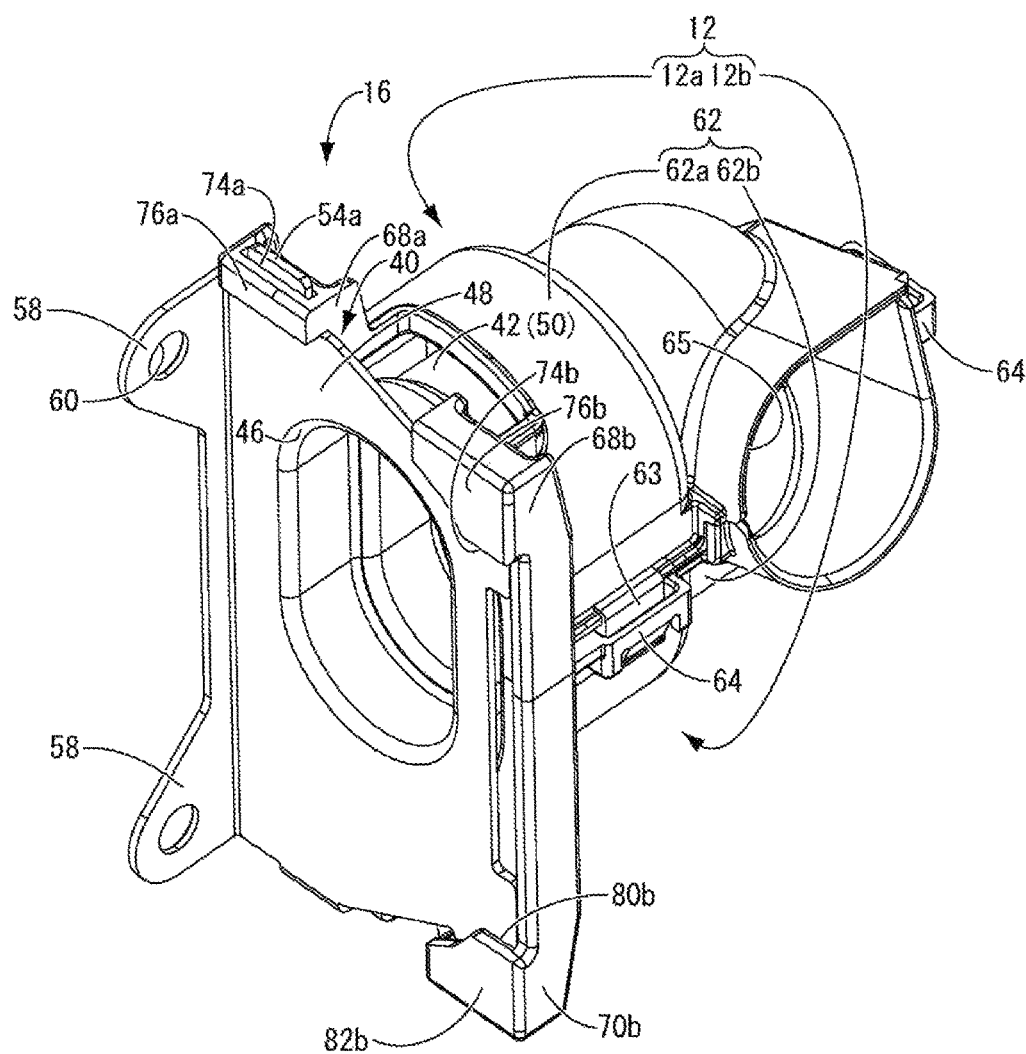
FIG. 5 is a perspective view showing an assembled state of a wiring harness protector with a metal bracket of the embodiment.

As shown in FIG. 5, one opening end part 65 of the protecting tube portion 62 is bent in L shape and extends toward a lower end side (toward a front side of FIG. 5 in the arrangement when the flange portion 48 is fixed to the other member 30) of the flange portion 48 of the metal bracket 40. As shown in FIGS. 6 and 7, flange wall portions 68, 70 substantially in the form of rectangular flat plates are provided on peripheral edge parts of the respective divided tube portions 62a, 62b constituting another opening end part 66 of the protecting tube portion 62 and project outwardly in the direction perpendicular to the axis. Here, as shown in FIG. 6, the flange wall portions 68 are composed of an upper flange wall portion 68a substantially in the form of a rectangular flat plate projecting on an upper end side (left side of FIG. 6 in the arrangement when the flange portion 48 is fixed to the other member 30) of the first divided body 12a and a lower flange wall portion 68b substantially in the form of a rectangular flat plate projecting on an lower end part (right side of FIG. 6 in the same arrangement). Surfaces of the upper and lower flange wall portions 68a, 68b on the side of the other opening end part 66 serve as contact surfaces 72a, 72b which come into contact with the flange portion 48 of the metal bracket 40 when the first divided body 12a is assembled with the flange portion 48 of the metal bracket 40. Further, on projecting end parts, which are side edge parts, of the upper and lower flange wall portions 68a, 68b, first engaging holes 74 composed of an upper first engaging hole 74a and a lower first engaging hole 74b and extending in the assembling direction are provided at positions corresponding to the upper and lower first engaging projections 54a, 54b constituting the first engaging projections 54. More specifically, the first engaging holes 74a, 74b are defined between facing surfaces of the flange wall portions 68a, 68b and facing wall portions 76a, 76b coupled to the flange wall portions 68a, 68b and extending in parallel to the flange wall portions 68a, 68b with clearances defined therebetween.

Figure 6:
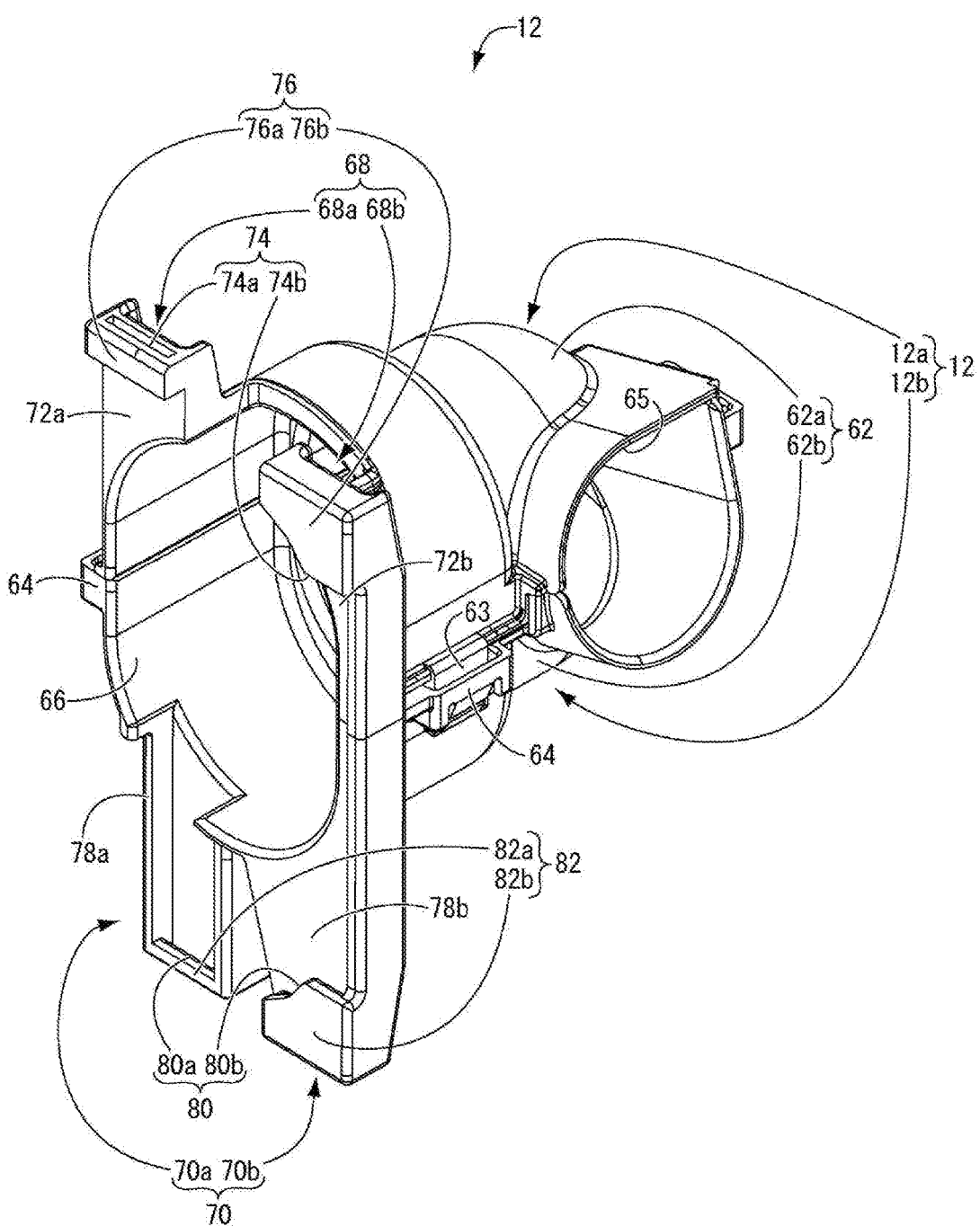
FIG. 6 is a perspective view showing an assembled state of the wiring harness protector of the embodiment and obtained by omitting the metal bracket from FIG. 5.
Figure 7:
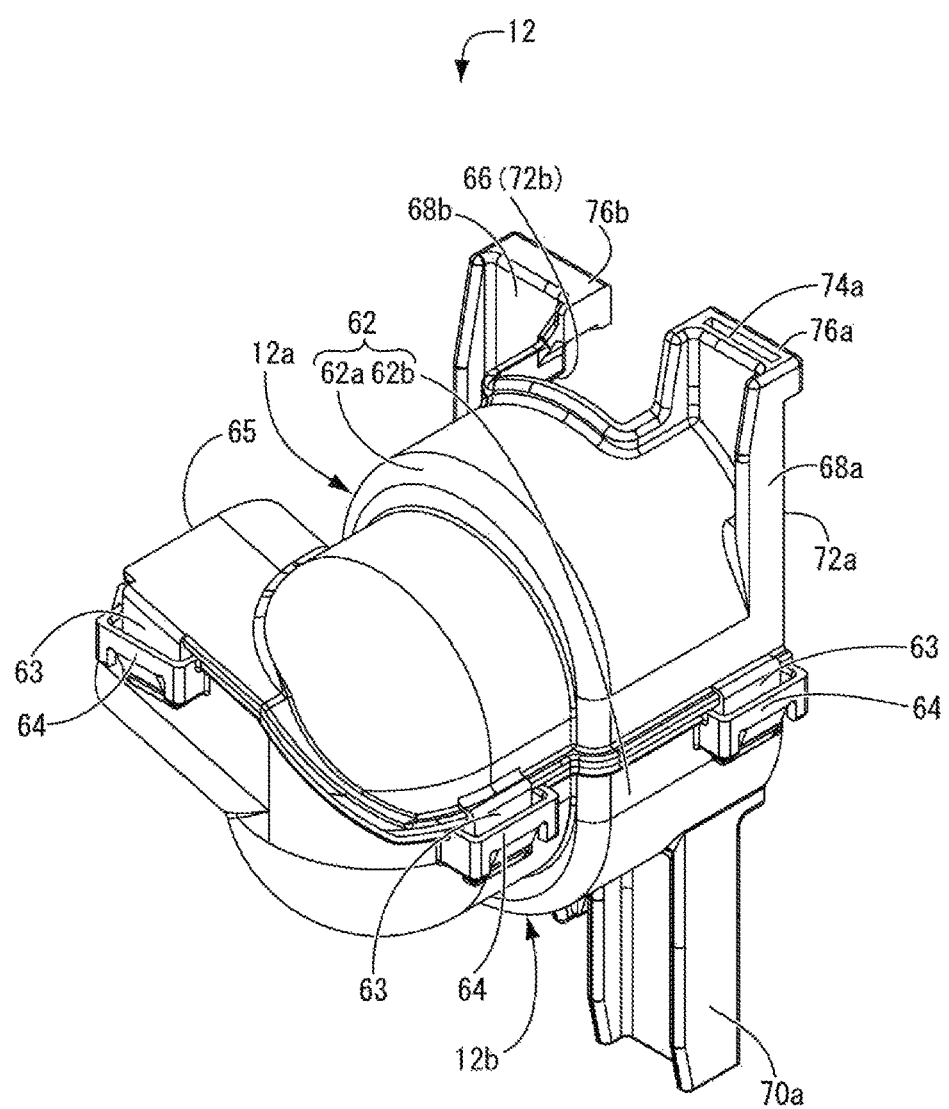
FIG. 7 is a perspective view when viewed from a back side of FIG. 6.

On the other hand, as shown in FIG. 6, the flange wall portions 70 are also composed of an upper flange wall portion 70a substantially in the form of a rectangular flat plate projecting on the upper end side (left side of FIG. 6 in the arrangement when the flange portion 48 of the metal bracket 40 is fixed to the other member 30) of the second divided body 12b and a lower flange wall portion 70b substantially in the form of a rectangular flat plate projecting on the lower end part (right side of FIG. 6 in the same arrangement). Surfaces of the upper and lower flange wall portions 70a, 70b on the side of the other opening end part 66 serve as contact surfaces 78a, 78b which come into contact with the flange portion 48 of the metal bracket 40 when the second divided body 12b is assembled with the flange portion 48 of the metal bracket 40. Further, on projecting end parts, which are side edge parts, of the upper and lower flange wall portions 70a, 70b, second engaging holes 80 having an upper second engaging hole 80a and a lower second engaging hole 80b and extending in the assembling direction are provided at positions corresponding to the upper and lower second engaging projections 56a, 56b constituting the second engaging projections 56. More specifically, the second engaging holes 80a, 80b are defined between facing surfaces of the flange wall portions 70a, 70b and facing wall portions 82a, 82b coupled to the flange wall portions 70a, 70b and extending in parallel to the flange wall portions 70a, 70b with clearances defined therebetween.

The wiring harness protector 12 is assembled with the metal bracket 40 constituting the wiring harness 10 as shown in FIGS. 1 to 4. More specifically, the first and second divided bodies 12a, 12b are brought closer to each other in the assembling direction (vertical direction in FIG. 1). In this way, the upper and lower first engaging projections 54a, 54b are respectively engaged with the upper and lower first engaging holes 74a, 74b and the upper and lower first engaging projections 56a, 56b are respectively engaged with the upper and lower second engaging holes 80a, 80b. Simultaneously, the four locking pieces 63 of the first divided body 12a are inserted into and locked to the four locking frames 64 of the second divided body 12b when the first and second divided bodies 12a, 12b are assembled. In this way, the wiring harness protector 12 is externally fitted to the end parts 16 of the wiring harness 10 and the connector housing 18 in which the terminal fittings 26 connected to the respective wires 14 are accommodated is caused to project through the other opening end part 66 of the wiring harness protector 12 and the other opening end part 46 of the metal bracket 40. This causes the end parts 16 of the wiring harness 10 to be guided by the wiring harness protector 12, maintained in a bent shape and protected from collision with the other member 30 and the like, and causes the wiring harness 10 to be pulled out from the one opening end part 65 of the protecting tube portion 62.

The first and second divided bodies 12a, 12b are respectively in contact with the flange portion 48 of the metal bracket 40 at the contact surface 72b of the lower flange wall portion 68b of the first divided body 12a and the contact surface 78b of the lower flange wall portion 70b of the second divided body 12b on the lower side (right side of FIG. 1) of the flange portion 48 of the metal bracket 40. Similarly, the first and second divided bodies 12a, 12b are respectively in contact with the flange portion 48 of the metal bracket 40 at the contact surface 72a of the upper flange wall portion 68a of the first divided body 12a and the contact surface 78a of the upper flange wall portion 70a of the second divided body 12b on the upper side (left side of FIG. 1) of the flange portion 48 of the metal bracket 40.

The wiring harness 10 having the wiring harness protector 12 externally fitted thereto is connected to the other member 30. The other member 30 is configured such that an unillustrated device main body is accommodated in an electrically conductive shield case 84. In connecting the wiring harness 10 to the other member 30, the connecting portions 32 of the terminal fittings 26 of the wires 14 projecting toward outside through the other opening end part 66 of the wiring harness protector 12 and the other opening end part 46 of the metal bracket 40 are bolted to unillustrated device-side terminals in the shield case 84. Subsequently, the flange portion 48 of the metal bracket 40 is placed on the shield case 84 and the fixing portions 58 of the flange portion 48 are fixed to the shield case 84 by screws. This causes the metal bracket 40 to be fixed to the shield case 84 and the wiring harness protector 12 to be fixed to the shield case 84 via the metal bracket 40. In this way, the wiring harness 10 is connected to the other member 30.

In the wiring harness 10 and the wiring harness protector 12 provided with the fixing structure according to this embodiment, the first and second engaging projections 54, 56 are formed on the flange portion 48 of the metal bracket 40, whereas the first and second engaging holes 74, 80 are respectively provided on the flange wall portions 68, 70 of the wiring harness protector 12. By engaging the engaging projections 54, 56 and the engaging holes 74, 80, the wiring harness protector 12 is fixed to the metal bracket 40. Thus, as compared to a conventional case provided with a fixing structure by a locking rib and an engaging groove between the outer surface of a tubular portion of a metal bracket and the inner surface of a wiring harness protector covering the tubular portion, a problem of water penetration through a small clearance between the locking rib and the engaging groove can be prevented and the waterproofness of the wiring harness protector 12 can be improved. Further, since it is not necessary to provide the fixing structure by the locking rib and the engaging groove, it is also possible to improve waterproofness by mounting the rubber seal 61 on the tubular portion 42 of the metal bracket 40 to close the clearance between the tubular portion 42 of the metal bracket 40 and the protecting tube portion 62 of the wiring harness protector 12.

Further, the wiring harness protector 12 is configured by the first and second divided bodies 12a, 12b assembled from the opposite sides in the direction perpendicular to the axis of the tubular portion 42 of the metal bracket 40. This can facilitate an operation of arranging the protecting tube portion 62 of the wiring harness protector 12 around the tubular portion 42 of the metal bracket 40 and an operation of engaging the engaging projections 54, 56 and the engaging holes 74, 80 even if the fixing structure for the metal bracket 40 and the wiring harness protector 12 is provided at a position different from the tubular portion 42 of the metal bracket 40 and the protecting tube portion 62 of the wiring harness protector 12.

In addition, since the contact surfaces 72a, 78a, 72b and 78b of the flange wall portions 68, 70 of the wiring harness protector 12 are configured to come into contact with the flange portion 48 of the metal bracket 40, a tensile force of the wiring harness 10 or the like applied to the wiring harness protector 12 can be supported by wide contact surfaces of the flange wall portions 68, 70 of the wiring harness protector 12 and the flange portion 48 of the metal bracket 40. Thus, an external force directly applied to the engaging projections 54, 56 and the engaging holes 74, 80 of the wiring harness protector 12 can be avoided. The wiring harness protector 12 can be firmly positioned and fixed to the end parts 16 of the wiring harness 10 with excellent durability. Further, since the contact surfaces 72b, 78b, 72a and 78a with the flange portion 48 of the metal bracket 40 are provided on the upper and lower sides of the flange wall portions 68, 70, the wiring harness protector 12 can be more stably supported and fixed to the metal bracket 40 on four points at opposite upper and lower sides of the wiring harness 10.

Further, the first and second engaging projections 54, 56 projecting outwardly from the side edge parts of the flange portion 48 in the assembling direction (vertical direction in FIG. 1) of the first and second divided bodies 12a, 12b of the wiring harness protector 12 and the first and second engaging holes 74, 80 extending in such an assembling direction are respectively provided at predetermined positions. This enables the engagement of the first and second engaging projections 54, 56 and the first and second engaging holes 74, 80, simultaneously with the assembling of the first and second divided bodies 12a, 12b only by bringing the first and second divided bodies 12a, 12b closer to each other in the assembling direction, and enables an operation of mounting the wiring harness protector 12 on the metal bracket 40 to be efficiently and easily performed. Further, since the pairs of the first and second engaging projections 54, 56 and the first and second engaging holes 74, 80 are respectively provided at the opposite upper and lower sides of the tubular portion 42 of the metal bracket 40, the wiring harness protector 12 can be more stably engaged with and fixed to the metal bracket 40 at four positions at the opposite upper and lower sides of the wiring harness 10. In addition, since the engaging projections 52 in the form of flat plates can be tightly held in the engaging holes 74, 80 defined between the facing surfaces of the flange wall portions 68, 70 and the facing wall portions 76, 82, a stable fixing structure can be realized.

Although the embodiment of the present invention has been described in detail above, the present invention is not limited to the specific description thereof. For example, although the contact surfaces 72b, 78b, 72a and 78a with the flange portion 48 of the metal bracket 40 are provided not only on the lower sides, but also on the upper sides of the flange wall portions 68, 70 of the wiring harness protector 12 in this embodiment, the contact surfaces 72b, 78b with the flange portion 48 of the metal bracket 40 may be provided only on the lower sides of the flange wall portions 68, 70 of the wiring harness protector 12 easily affected by a load applied to the wiring harness 10 when the wiring harness 10 is pulled out downwardly from a position where the metal bracket 40 is fixed to the other member 30. This enables an external force applied from the wiring harness 10 to be more effectively and stably dispersed and supported on the metal bracket 40 via the wiring harness protector 12, and it is possible to stably fix the wiring harness protector 12 and further improve durability.

Further, a mechanism for holding the first and second divided bodies 12a, 12b in an assembled state is not limited to the illustrated locking pieces 63 and locking frames 64 and any mechanism can be adopted if the first and second divided bodies 12a, 12b can be held in the assembled state. Although the rubber seal 61 is arranged between the tubular portion 42 of the metal bracket 40 and the protecting tube portion 62 of the wiring harness protector 12 in the illustrated embodiment, it is not always necessary. Waterproofness may be ensured by directly holding the tubular portion 42 of the metal bracket 40 and the protecting tube portion 62 of the wiring harness protector 12 in close contact.

LIST OF REFERENCE SIGNS

10: wiring harness
12: wiring harness protector
12a: first divided body
12b: second divided body
16: end part
20: shield member
30: other member
38: braided wire
40: metal bracket
42: tubular portion
44: one opening end part
46: other opening end part
48: flange portion
52: engaging projection
54: first engaging projection
56: second engaging projection
58: fixing portion
61: seal rubber
62: protecting tube portion
62a, 62b: divided tube portion
65: one opening end part
66: other opening end part
68: flange wall portion
70: flange wall portion
72a, 72b: contact surface
74: first engaging hole (engaging hole)
76: facing wall portion
78a, 78b: contact surface
80: second engaging hole (engaging hole)
82: facing wall portion

What is claimed is:

1. A wiring harness protector fixing structure used for a wiring harness, on an end part of which a tubular portion of a metal bracket to be fixed to an other member and a shield member formed of a braided wire extending from one opening end part of the tubular portion and obtained by braiding metal thin wires into a mesh are externally fitted, and configured to protect the end part of the braided wire, wherein:
   a flange portion extending outward in a direction perpendicular to an axis of the tubular portion is formed on an other opening end part of the tubular portion of the metal bracket and engaging projections are formed on the flange portion;
   the wiring harness protector includes a first divided body and a second divided body to be assembled and integrated from opposite sides in the direction perpendicular to the axis of the tubular portion of the metal bracket;
   each of the first and second divided bodies includes a divided tube portion, a protecting tube portion for covering the tubular portion of the metal bracket from an outer peripheral side is formed by assembling the divided tube portions with the first and second divided bodies assembled and the wiring harness is pulled out from one opening end part of the protecting tube portion; and
   flange wall portions extending in the direction perpendicular to the axis are provided to project on peripheral edge parts of the respective divided tube portions constituting the other opening end part of the protecting tube portion, and the engaging projections of the metal bracket are engaged with engaging holes provided on the flange wall portions and contact surfaces provided on at least parts of the flange wall portions come into contact with the flange portion of the metal bracket by assembling the first and second divided bodies.

2. The wiring harness protector fixing structure of claim 1, wherein:
   a fixing portion to be fixed to the other member is provided on an upper end part of the flange portion of the metal bracket; and
   the contact surfaces are provided on parts of the flange wall portions of the respective first and second divided bodies to be overlapped with a lower side of the flange portion of the metal bracket.

3. The wiring harness protector fixing structure of claim 2, wherein the contact surfaces are provided also on parts of the flange wall portions of the respective first and second divided bodies to be overlapped with an upper side of the flange portion of the metal bracket.

4. The wiring harness protector fixing structure of claim 1, wherein:
   the engaging projections provided on the flange portion of the metal bracket include a first engaging projection and a second engaging projection projecting from side edge parts of the flange portion outwardly away from each other in an assembling direction of the first and second divided bodies with the tubular portion of the metal bracket at two positions separated in the assembling direction;
   the flange wall portion of the first divided body and the flange wall portion of the second divided body constituting the wiring harness protector are respectively provided with a first engaging hole and a second engaging hole extending in the assembling direction at positions of side edge parts of the flange wall portions corresponding to the first and second engaging projections; and
   the first engaging projection is engaged with the first engaging hole and the second engaging projection is engaged with the second engaging hole by bringing the first and second divided bodies closer to each other in the assembling direction.

5. The wiring harness protector fixing structure of claim 4, wherein a combination of the first engaging projection and the first engaging hole and a combination of the second engaging projection and the second engaging hole are respectively provided at opposite upper and lower sides of the tubular portion of the metal bracket.

6. The wiring harness protector fixing structure of claim 1, wherein the engaging projections are shaped to be flat plates projecting on a peripheral edge part of the flange portion and the engaging holes are defined between facing surfaces of the flange wall portions and facing wall portions coupled to the flange wall portions and extending in parallel to the flange wall portions with clearances defined therebetween.

7. The wiring harness protector fixing structure of claim 1, wherein a clearance between the tubular portion and the protecting tube portion is closed by a rubber seal mounted on the tubular portion of the metal bracket.

* * * * *